United States Patent
Okuno et al.

(10) Patent No.: US 6,453,103 B1
(45) Date of Patent: Sep. 17, 2002

(54) OPTICAL COMMUNICATION SYSTEM

(75) Inventors: Toshiaki Okuno; Motoki Kakui, both of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/833,619

(22) Filed: Apr. 13, 2001

Related U.S. Application Data

(63) Continuation-in-part of application No. PCT/JP00/01236, filed on Mar. 2, 2000.

(30) Foreign Application Priority Data

Mar. 9, 1999 (JP) ............................... 11-061672

(51) Int. Cl.$^7$ ............................... G02B 6/02
(52) U.S. Cl. ............................... 385/123; 385/1; 385/3
(58) Field of Search ............................... 385/123, 1, 3, 385/147, 124

(56) References Cited

U.S. PATENT DOCUMENTS

| | | | | |
|---|---|---|---|---|
| 5,539,563 A | * | 7/1996 | Park ............................... | 359/160 |
| 5,778,128 A | * | 7/1998 | Wildeman ............................... | 359/124 |
| 6,019,873 A | * | 2/2000 | Knapick et al. ............................... | 162/189 |
| 6,169,837 B1 | * | 1/2001 | Kato et al. ............................... | 385/123 |
| 6,377,740 B1 | * | 4/2002 | Onishi et al. ............................... | 385/123 |
| 2001/0000442 A1 | * | 4/2001 | Okuno et al. ............................... | 359/124 |
| 2001/0051017 A1 | * | 12/2001 | Okuno ............................... | 385/24 |

FOREIGN PATENT DOCUMENTS

| | | | | |
|---|---|---|---|---|
| EP | 0851245 A2 | 7/1998 | ............ | G02B/6/16 |
| EP | 0877496 A2 | 11/1998 | ............ | H04B/10/10 |
| GB | 2268018 A | 12/1993 | ............ | H04B/10/18 |
| JP | 08-146472 | 6/1996 | ............ | G02F/1/35 |
| JP | 9-23187 | 1/1997 | ............ | H04B/10/02 |
| JP | 09-297326 | 11/1997 | ............ | G02F/1/35 |
| JP | 11-017624 | * 1/1999 | ............ | 385/123 |
| JP | 11-037837 | * 8/2000 | ............ | 385/123 |

OTHER PUBLICATIONS

International Search Report dated Jun. 6, 2000.
"Cross–Phase Modulation in Dispersive Fibers: Theoretical and Experimental Investigation of the Impact of Modulation Frequency", Ting–Kuang Chiang et al., IEEE Photonic Technology Letters, vol. 6, No. 6, Jun. 1994, pp. 733–736.
"L–Band 64x10 Gb/s DWDM Transmission over 500 km DSF with 50 GHz Channel Spacing", A.K. Srivastava et al., ECOC '98, Sep. 20–24, 1998, pp. 74–75.
"640 GB/s WDM Transmission Over 400km of Dispersion–Shifted Fiber Using 1.58 μm Band and Initial Chirp Optimization", Y. Yano et al., ECOC '98, Sep. 20–24, 1998, pp. 261–262.

(List continued on next page.)

*Primary Examiner*—Robert H. Kim
*Assistant Examiner*—Krystyna Suchecki
(74) *Attorney, Agent, or Firm*—McDermott, Will & Emery

(57) ABSTRACT

An optical communication system having a structure for effectively suppressing occurrence of a nonlinear optical phenomenon in WDM transmission in the 1.58 pm wavelength band. The optical communication system is a hybrid transmission unit including a dispersion-shifted optical fiber having a zero-dispersion wavelength in the 1.55 μm wavelength band, a dispersion $D_{DSF}$ and a length $L_{DSF}$, and a high-dispersion fiber having dispersion $D_1$ and length $L_1$. A signal light having the shortest wavelength and having a bit rate B in the signal light wavelength band, the hybrid transmission unit satisfies the following condition:

$$\Delta\phi_{XPM} \cdot D_T \leq 18000 \text{ (unit: } (ps/nm) \cdot (Gb/s)^2)$$

$$D_T = (D_{DSF} \cdot L_{DSF} + D_1 \cdot L_1) \cdot B^2$$

where $\Delta\phi_{XPM}$ is the total phase shift amount of cross-phase modulation in the signal light having the shortest wavelength under the influence of signal light having the other wavelengths, and $D_T$ is the total dispersion in the hybrid transmission unit.

20 Claims, 4 Drawing Sheets

OTHER PUBLICATIONS

"1580–nm Band, Equally Spaced 8x10 Gb/s WDM Channel Transmission Over 360 km (3x120 km) of Dispersion–Shifted Fiber Avoiding FWM Impairment", IEEE Photonics Technology Letters, vol. 10, No. 3, Mar. 1998, pp 454–456.

"Properties of Gain–shifted EDFA (1580 nm–band EDFA) Cascades in WDM Transmission Systems", T. Sakamoto et al, NTT Optical Network Systems Laboratories, TuB3–1, pp. 88–90.

"Impact of cross–phase modulation on WDM transmission over dispersion–shifted fiber", Nobuhiko Kikuchi et al., OFC '96 Technical Digest, pp. 40–42.

English Translation of "Study of Transmission Properties in SMF and DSF Hybrid Lines", 1998 National Convention Record, The Institute of Electronics, Information and Communication Engineers, pp. 1–4 (original p. 591).

* cited by examiner

OPTICAL COMMUNICATION SYSTEM

RELATED APPLICATIONS

This is a Continuation-In-Part application of International Patent application serial No. PCT/JP00/01236, filed on Mar. 2, 2000, now pending, which in turn claims the benefit of Japanese Patent Application No. 11-61672, filed on Mar. 9, 1999, the disclosures of which Applications are incorporated by reference herein. The benefit of the filing and priority dates of the International and Japanese Applications is respectfully requested.

BACKGROUND OF THE INVENTION

1. Field of the Invention

The present invention relates to an optical communication system suitable for wavelength division multiplexing (WDM) communications utilizing a plurality of signal light components in a 1.58-$\mu$m wavelength band (1565 nm to 1620 nm).

2. Related Background Art

WDM communications area type of optical communications enabling large-capacity communications by utilizing a plurality of signal light components having wavelengths different from each other. In WDM communications, a 1.55-$\mu$m wavelength band (1530 nm to 1565 nm) has conventionally been utilized as a signal light wavelength band in the WDM communications since silica type optical fibers, which are typically used as a transmission line, have a low transmission loss in the 1.55-$\mu$m wavelength band, and since Er-doped optical fiber amplifiers (EDFA: Er-Doped Fiber Amplifier) have a large gain in the 1.55-$\mu$m wavelength band.

The optical transmission line employed in WDM communications in the 1.55-$\mu$m wavelength band can utilize not only the above-mentioned silica type optical fibers, but also single-mode optical fibers having a zero-dispersion wavelength in a 1.3-$\mu$m wavelength band (1260 nm to 1350 nm), dispersion-shifted optical fibers having a zero-dispersion wavelength in the 1.55-$\mu$m wavelength band, or hybrid transmission lines in which these optical fibers are mixed. Since the above-mentioned single-mode optical fibers have a large positive dispersion in the 1.55- $\mu$m wavelength band, dispersion-compensating optical fibers having a large negative dispersion in the 1.55-$\mu$m wavelength band are utilized as a dispersion compensator for compensating for the dispersion of the single-mode optical fibers in the 1.55-$\mu$m wavelength band.

SUMMARY OF THE INVENTION

The inventors have studied conventional optical communication systems in detail and, as a result, have found problems as follows.

Namely, since dispersion-shifted optical fibers exhibit a very small absolute value of dispersion (substantially zero) in the 1.55-$\mu$m wavelength band and have a small effective area in general, signal light waveforms are likely to deteriorate due to nonlinear optical phenomena, such as four-wave mixing in particular, in the case of WDM communications in the 1.55-$\mu$m wavelength band. Since such deterioration of signal light waveforms caused by nonlinear optical phenomena cannot be restored, it is necessary that the occurrence of such nonlinear optical phenomena be suppressed as much as possible. For suppressing the occurrence of nonlinear optical phenomena, the power of signal light maybe lowered. In this case, however, repeater intervals have to be shortened in long-distance optical communications, whereby the cost rises. Therefore, as another potent method, optical communications may be carried out in a wavelength band, different from the 1.55-$\mu$m wavelength band, where dispersion occurs to a certain extent.

On the other hand, further larger capacity is demanded in the field of optical communications. From this viewpoint of achieving a larger capacity, the research and development aimed at widening the bandwidth that can be amplified by optical fiber amplifiers or utilizing wavelength bands other than the 1.55-$\mu$m wavelength band has been under way. As optical fiber amplifiers which can amplify signal light in wavelength bands other than the 1.55-$\mu$m wavelength band, those capable of amplifying signal light in the 1.58-$\mu$m wavelength band have been realized, for example.

From the background as in the foregoing, WDM communications in the 1.58-$\mu$m wavelength band in place of or in addition to the 1.55-$\mu$m wavelength band have been considered for practical use. In this case, the transmission loss of silica type optical fibers is relatively low even in the 1.58-$\mu$m wavelength band, whereby there are no inconveniences in particular.

Configurations of optical communication systems which transmit signal light in the 1.58-$\mu$m wavelength band are described, for example, in a literature—A. K. Srivastava, et al., ECOC'98, postdeadline paper, pp. 73–75 (1998)—, a literature—Yano, et al., ECOC'98, pp. 261–262 (1998)—, a literature—T. Sakamoto, et al., OAA'98, TuB3, pp. 88–91 (1998)—, and a literature—M. Jinno, et al., IEEE Photon. Technol. Lett., Vol. 10, No. 3, pp. 454–456 (1998)—, for example. In each of the optical communication systems described in these literatures, the optical transmission line is constituted by a dispersion-shifted optical fiber alone. Since the dispersion-shifted optical fiber having a zero-dispersion wavelength in the 1.55-$\mu$m wavelength band has a dispersion with an absolute value of about 2 to 3 ps/nm/km in the 1.58 -$\mu$m wavelength band, four-wave mixing is relatively hard to occur therein.

On the other hand, dispersion-shifted optical fibers have a transmission loss slightly higher than that of optical fibers yielding a low transmission loss, such as single-mode optical fibers having a zero-dispersion wavelength near a wavelength of 1.3 $\mu$m. Therefore, if such a low-loss optical fiber is employed in a part behind a dispersion-shifted optical fiber, then total loss can be lowered. However, the low-loss optical fibers have a dispersion with a large absolute value in the 1.58-$\mu$m wavelength band in general. In this case, if a system is constructed carelessly, then it may not function as an optical communication system.

For solving the problems mentioned above, it is an object of the present invention to provide an optical communication system comprising a structure for effectively restraining signal light waveforms from deteriorating due to the occurrence of nonlinear optical phenomena, such as cross-phase modulation in particular, in WDM communications in the 1.58-$\mu$m wavelength band even when it is an optical communication system including a dispersion-shifted optical fiber having a zero-dispersion wavelength in the 1.55-$\mu$m wavelength band.

The optical communication system according to the present invention comprises at least one hybrid transmission unit. As a first configuration, this hybrid transmission unit has a dispersion-shifted optical fiber and a first high-dispersion optical fiber, whereas the dispersion-shifted optical fiber is disposed upstream the first high-dispersion optical fiber such that a WDM signal successively propagates through the dispersion-shifted optical fiber and the first high-dispersion optical fiber. The dispersion-shifted optical fiber is an optical fiber with a length $L_{DSF}$ having a zero-dispersion wavelength in the 1.55-μm wavelength band (1530 nm to 1565 nm) and exhibiting, at a wavelength of 1.58 μm, a dispersion $D_{DSF}$ with an absolute value of 0.5 ps/nm/km or more. The first high-dispersion optical fiber is an optical fiber with a length $L_1$ exhibiting, at a wavelength of 1.58 μm, a dispersion $D_1$ having an absolute value greater than that of the dispersion $D_{DSF}$ of the dispersion-shifted optical fiber. Here, the dispersion-shifted optical fiber and the first high-dispersion optical fiber may be disposed such that a repeater including a coupler and an optical amplifier, for example, is interposed therebetween.

In particular, with respect to at least signal light having the shortest wavelength in signal light having a bit rate B included in a signal light wavelength band in which wavelength ranges from 1.565 μm to 1.610 μm, the hybrid transmission unit of the first configuration comprising the dispersion-shifted optical fiber and first high-dispersion optical fiber satisfies the following condition:

$$\Delta\phi_{XPM} \cdot D_T \leq 18000 \text{ (unit:} (ps/nm) \cdot (Gb/s)^2)$$

$$D_T = (D_{DSF} \cdot L_{DSF} + D_1 \cdot L_1) \cdot B^2$$

where $\Delta\phi_{XPM}$ is the total phase shift amount of cross-phase modulation in the signal light having the shortest wavelength under the influence of signal light having the other wavelengths, and DT is the total dispersion in the hybrid transmission unit.

On the other hand, the optical communication system according to the present invention may comprise a structure for compensating for the dispersion occurring in the system. In this case, as a second configuration, the hybrid transmission unit comprises a second high-dispersion optical fiber in addition to the dispersion-shifted optical fiber and first high-dispersion optical fiber. This second high-dispersion optical fiber is an optical fiber with a length $L_2$ exhibiting, with respect to light having a wavelength of 1.58 μm, a dispersion $D_2$ having an absolute value greater than that of the dispersion $D_{DSF}$ of the dispersion-shifted optical fiber and a polarity different from that of the dispersion $D_1$ of the first high-dispersion optical fiber; and is disposed in one of a transmission line (upstream the dispersion-shifted optical fiber) through which light to enter the dispersion-shifted optical fiber propagates, a transmission line between the dispersion-shifted optical fiber and the first high-dispersion optical fiber, and a transmission line (downstream the first high-dispersion optical fiber) through which light emitted from the first high-dispersion optical fiber is to propagate.

With respect to at least signal light having the shortest wavelength in signal light having a bit rate B included in a signal light wavelength band in which wavelength ranges from 1.565 μm to 1.610 μm, the hybrid transmission unit of the second configuration comprising the dispersion-shifted optical fiber, first high-dispersion optical fiber, and second high-dispersion optical fiber as such satisfies the following condition:

$$\Delta\phi_{XPM} \cdot D_T < 18000 \text{ (unit:} (ps/nm) \cdot (Gb/s)^2)$$

$$D_T = (D_{DSF} \cdot L_{DSF} + D_1 \cdot L_1 + D_2 \cdot L_2) \cdot B^2$$

where $\Delta\phi_{XPM}$ is the total phase shift amount of cross-phase modulation in the signal light having the shortest wavelength under the influence of signal light having the other wavelengths, and $D_T$ is the total dispersion in the hybrid transmission unit.

In each of the above-mentioned configurations, if N (>2) channels of signal light propagate through the optical communication system, then the total phase shift amount $\Delta\phi_{XPM}$ (i) resulting from the cross-phase modulation in signal light having a wavelength $\lambda_i$ (i=1, 2, . . . , N) incident on the dispersion-shifted optical fiber under the influence of signal light having a wavelength $\lambda_j$ (j=1, 2, . . . , N; j≠i) is given by the following expression:

$$\Delta\phi_{XPM}(i) = 2 \cdot \gamma \cdot L_{eff} \cdot \sum_{(j=1, j\neq i)}^{N} \left( P(j) \cdot \sqrt{\eta_{XPM}(i,j)} \right)$$

where γ is the nonlinear coefficient in the dispersion-shifted optical fiber, $L_{eff}$ is the effective length of the dispersion-shifted optical fiber, P(j) is the peak power of each of (N−1) channels of signal light excluding the wavelength $\lambda_i$, and $\eta_{XPM}$(i,j) is the efficiency of occurrence of cross-phase modulation between the wavelengths $\lambda_i$ and $\lambda_j$ of signal light. If two channels of signal light having respective wavelengths $\lambda_1$ and $\lambda_2$ propagate through the hybrid transmission unit, on the other hand, then the total phase shift amount $\Delta\phi_{XPM}$(1) resulting from the cross-phase modulation in the signal light having the wavelength $\lambda_1$ incident on the dispersion-shifted optical fiber under the influence of the signal light having the wavelength $\lambda_2$ is given by the following expression:

$$\Delta\phi_{XPM}(1) = 2 \cdot \gamma \cdot L_{eff}(P(2) \cdot \sqrt{\eta_{XPM}(1,2)})$$

Further, the effective length $L_{eff}$ of the dispersion-shifted optical fiber and the efficiency of occurrence of cross-phase modulation $\eta_{XPM}$(i,j) between the wavelengths $\lambda_i$ and $\lambda_j$ of signal light are given by the following expressions:

$$L_{eff} = (1 - \exp(-\alpha \cdot L_{DSF}))/\alpha$$

$$\eta_{XPM}(i,j) = \frac{\alpha^2}{\Omega_m^2 \cdot d(i,j)^2 + \alpha^2} \cdot \left[ 1 + \frac{4 \cdot \sin^2\left(\Omega_m \cdot d(i,j) \cdot \frac{L_{DSF}}{2}\right) \cdot e^{-\alpha L_{DSF}}}{(1 - e^{-\alpha L_{DSF}})^2} \right]$$

where α is the transmission loss in the dispersion-shifted optical fiber, $\Omega_m$ is the modulation frequency, and d(i,j) is the delay time difference per unit distance between the wavelengths $\lambda_i$ and $\lambda_j$ of signal light.

In the optical communication system according to the present invention, the hybrid transmission units of the first and second configurations satisfy a condition under which the product $\phi_{XPM} \cdot D_T$ becomes 18000 (ps/nm)·(Gb/s)² or less with respect to the shortest wavelength of signal light included in the signal light wavelength band. As a consequence, signal light waveforms are restrained from deteriorating due to interactions between the occurrence of nonlinear optical phenomena, such as cross-phase modulation in particular, and dispersion. In a system having secured an appropriate SN ratio, its power penalty becomes about 1.0 dB or less, and a bit error rate of $10^{-9}$ or less can be achieved. If the product $\phi_{XPM} \cdot D_T$ becomes 13000 (ps/nm)·(Gb/s)² or less with respect to the shortest wavelength of signal light included in the signal light wavelength band, then the above-mentioned power penalty becomes substantially 0.2 dB or less, and the above-mentioned bit error rate can attain $10^{-15}$ or less. From the viewpoint of suppressing the above-mentioned power penalty and bit error rate, the product $\phi_{XPM} \cdot D_T$ is most preferably 13000 (ps/nm)·(Gb/s)² or less with respect to all of the signal light included in the signal wavelength band.

In particular, the hybrid transmission unit of the second configuration including the second high-dispersion optical fiber having the dispersion $D_2$ with a polarity opposite to that of the dispersion $D_1$ of the first high-dispersion optical fiber can lower the parameter $D_T$ (total dispersion amount in the hybrid transmission unit) and, consequently, the product $\phi_{XPM} \cdot D_T$, thereby being able to remarkably reduce both power penalty and bit error rate.

Preferably, the dispersion-shifted optical fiber included in each of the hybrid transmission units of the first and second configurations has a positive dispersion at a wavelength of 1.58 µm. In this case, waveforms of signal light enhance their eye under the pulse compression, which is desirable in terms of transmission. However, it would yield a higher peak power, whereby signal light waveforms are more likely to occur due to nonlinear optical phenomena. If the hybrid transmission units are designed such that the product $\phi_{XPM} \cdot D_T$ falls within the above-mentioned ranges, however, then favorable transmission characteristics can be secured.

Preferably, in the hybrid transmission system of the second configuration, one of the first and second high-dispersion optical fibers is a single-mode optical fiber having a zero-dispersion wavelength in the 1.3-µm wavelength band, whereas the other is a dispersion-compensating optical fiber for compensating for the dispersion of the single-mode optical fiber in the signal light wavelength band. If an optical amplifier for amplifying signal light included in the signal light wavelength band is disposed upstream the dispersion-shifted optical fiber in the hybrid transmission unit of the second configuration, then the dispersion-compensating optical fiber is preferably disposed upstream the optical amplifier. This is because of the fact that, if the dispersion-compensating optical fiber is disposed upstream the optical amplifier, then the power of signal light propagating through the dispersion-compensating optical fiber is lowered, whereby nonlinear optical phenomena can effectively be restrained from occurring in the dispersion-compensating optical fiber having a high nonlinear characteristic in general. As a consequence, signal light waveforms can effectively be kept from deteriorating. Also, the dispersion-compensating optical fiber having a large negative dispersion widens the pulse waveform of signal light, and effectively lowers its peak power. Therefore, the signal light having a relatively low peak power would propagate through the dispersion-shifted optical fiber after being amplified by the optical amplifier, whereby the occurrence of nonlinear optical phenomena in the dispersion-shifted optical fiber can be suppressed (signal light waveforms can be kept from deteriorating) according to this configuration as well.

Preferably, in the hybrid transmission unit of the first configuration, each of the dispersion-shifted optical fiber and first high-dispersion optical fiber has a polarization mode dispersion of 2 ps·km$^{-\frac{1}{2}}$ or less in the signal light wavelength band. In the hybrid transmission unit of the second configuration, it is preferred that, in the signal light wavelength band, each of the dispersion-shifted optical fiber and first high-dispersion optical fiber have a polarization mode dispersion of 2 ps·km$^{-\frac{1}{2}}$ or less, and the second high-dispersion optical fiber have a polarization mode dispersion of 1 ps·km$^{-\frac{1}{2}}$ or less. Preferably, in each of the hybrid transmission units of the first and second configurations, the hybrid transmission unit has a total accumulated polarization dispersion of 1/(4B) or less in the signal light wavelength band. Each of these cases can more effectively restrain signal light waveforms from deteriorating due to cross-phase modulation and dispersion which depend on the polarization state of signal light.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 5A is a view showing the configuration of a first applied example of the optical communication system according to the first embodiment shown in FIG. 1, whereas

DETAILED DESCRIPTION OF THE PREFERRED EMBODIMENTS

In the following, embodiments of the optical communication system according to the present invention will be explained with reference to FIGS. 1 to 4, 5A, 5B, and 6 to 8. Among the drawings, constituents identical to each other will be referred to with numerals identical to each other without repeating their overlapping explanations.

First Embodiment

Figure 1:
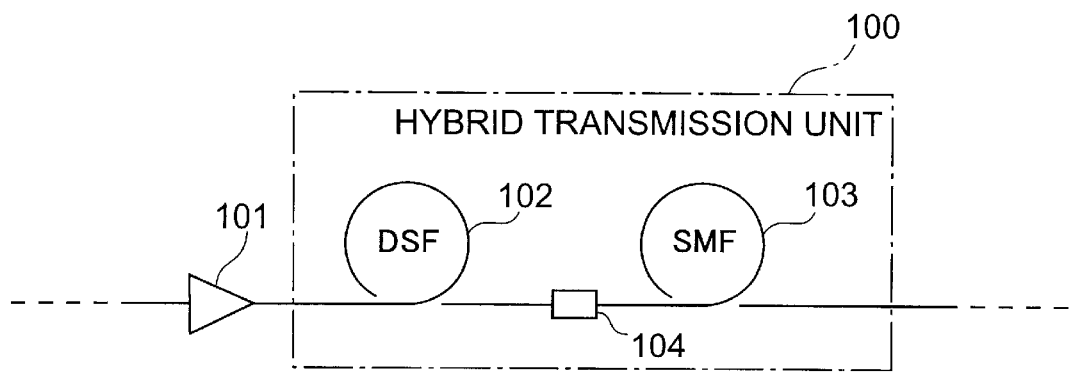
FIG. 1 is a view showing the configuration of a first embodiment of the optical communication system according to the present invention.

To begin with, a first embodiment of the optical communication system according to the present invention will be explained. FIG. 1 is a view showing the configuration of the optical communication system according to the first embodiment. The optical communication system according to the first embodiment comprises an optical fiber amplifier 101 for amplifying signal light in the 1.58-µm wavelength band, and a hybrid transmission unit 100 disposed downstream the optical fiber amplifier 101. The hybrid transmission unit 100 comprises a dispersion-shifted optical fiber (DSF: Dispersion-Shifted Fiber) 102 disposed downstream the optical fiber amplifier 101, and a single-mode optical fiber (SMF: Single Mode Fiber) 103 as a high-dispersion optical fiber disposed downstream the DSF 102. Though the DSF 102 and SMF 103 may directly be fusion-spliced to each other, they may be optically coupled to each other by way of optical members such as coupler and optical amplifier or a repeater including them.

The optical fiber amplifier 101 comprises an amplification optical fiber whose core region is doped with Er element or the like, and a light source for supplying a predetermined wavelength of excitation light to the amplification optical fiber. The optical fiber amplifier 101 collectively amplifies a plurality of signal light components in the 1.58-μm wavelength band inputted to the amplification optical fiber when the excitation light is being supplied to the amplification optical fiber by the light source.

The DSF 102 positioned downstream the optical fiber amplifier 101 has a zero-dispersion wavelength in the 1.55-μm wavelength band. At a wavelength of 1.58 μm, the DSF 102 has a dispersion $D_{DSF}$ with an absolute value of 0.5ps/nm/km or more (the absolute value of dispersion $D_{DSF}$ being 5ps/nm/km or less in general), whereas the dispersion $D_{DSF}$ is a positive value in general.

The SMF 103 positioned downstream the DSF 102 has a zero-dispersion wavelength in the 1.3-μm wavelength band. At a wavelength of 1.58 μm, the SMF 103 has a dispersion DSMF of about 19 ps/nm/km, which is greater than the absolute value of the dispersion $D_{DSF}$ of DSF 102.

In the optical communication system according to the first embodiment comprising such a configuration, the occurrence of cross-phase modulation (XPM) becomes more problematic in the DSF 102 than that of four-wave mixing.

For effectively suppressing the occurrence of such a nonlinear optical phenomenon, each embodiment of the optical communication system according to the present invention provides the following solution.

In the optical communication system through which N (>2) channels of signal light propagate, the total phase shift amount $\Delta\phi_{XPM}(i)$ resulting from the cross-phase modulation in signal light having a wavelength $\lambda_i$ (i=1, 2, . . . , N) incident on the DSF 102 under the influence of signal light having a wavelength $\lambda_j$ (j=1, 2, . . . , N; j ≠i) is given by the following expression:

$$\Delta\phi_{XPM}(i) = 2 \cdot \gamma \cdot L_{eff} \cdot \sum_{(j=1, j\neq i)}^{N} \left( P(j) \cdot \sqrt{\eta_{XPM}(i, j)} \right) \quad (1)$$

Here, P(j) is the peak power of each of (N−1) channels of signal light excluding the wavelength $\lambda_i$ in the signal light incident on the optical fiber amplifier 101 after being outputted from the optical fiber amplifier 101, and γ is the nonlinear coefficient of the DSF 102. In the case where two channels of signal light having respective wavelengths $\lambda_1$ and $\lambda_2$ propagate through this optical communication system, the total phase shift amount $\Delta\phi_{XPM}(1)$ resulting from the cross-phase modulation in the signal light having the wavelength $\lambda_1$ incident on the DSF 102 under the influence of the signal light having the wavelength $\lambda_2$ is given by the following expression:

$$\Delta\phi_{XPM}(1) = 2 \cdot \gamma \cdot L_{eff} \cdot (P(2) \cdot \sqrt{\eta_{XPM}(1,2)}) \quad (2)$$

The nonlinear coefficient y is represented by the following expression:

$$\gamma = \frac{2\pi}{\lambda} \cdot \frac{n_2}{A_{eff}} \quad (3)$$

where λ is the wavelength of signal light, $n_2$ is the nonlinear refractive index of the core region of DSF 102, and $A_{eff}$ is the effective area of DSF 102.

$L_{eff}$ is the effective length of DSF 102, and is represented by the following expression:

$$L_{eff} = \frac{1 - e^{-\alpha L_{DSF}}}{\alpha} \quad (4)$$

where α is the transmission loss of signal light in the DSF 102 having a length $L_{DSF}$. On the other hand, $\eta_{XPM}(i,j)$ is the efficiency of occurrence of cross-phase modulation. In the case where signal light is modulated in the form of a sine wave at a modulation frequency $\Omega_m$, for example, 72 $_{XPM}$ (i,j) is represented by the following expression:

$$\eta_{XPM}(i, j) = \quad (5)$$

$$\frac{\alpha^2}{\Omega_m^2 \cdot d(i, j)^2 + \alpha^2} \cdot \left[ 1 + \frac{4 \cdot \sin^2\left(\Omega_m \cdot d(i, j) \cdot \frac{L_{DSF}}{2}\right) \cdot e^{-\alpha L_{DSF}}}{(1 - e^{-\alpha L_{DSF}})^2} \right]$$

where d(i,j) is the delay time difference per unit distance between the wavelengths $\lambda_i$ (i=1, 2, . . . , N) and $\lambda_j$ (j=1, 2, . . . , N; j≠i) of signal light. In the above-mentioned expressions (1) to (5), each of the transmission loss α and effective area $A_{eff}$ is assumed to be constant in the signal light wavelength band. The efficiency of occurrence $\eta_{XPM}(i, j)$ is a value of 0 or more but not exceeding 1, and becomes greater as the absolute value of dispersion $D_{DSF}$ is smaller in the signal light wavelength band. Also, it becomes greater as the wavelength difference between two channels of signal light is smaller, and attains the maximum value of 1 under the worst condition where the dispersion $D_{DSF}$ is zero.

Here, letting the signal light wavelength λ be 1.58 μm, the nonlinear refractive index $n_2$ of the DSF 102 with respect to linearly polarized light be $3 \times 10^{-20}$ m²/W, the effective length $L_{eff}$ of the DSF 102 be 20 km, the input signal light peak power P (which can be approximated by a value obtained by dividing the average power of input signal light by the duty cycle) be 10 dBm (=10 mW), and the efficiency of occurrence $\eta_{XPM}(i,j)$ be 1, the nonlinear coefficient γ becomes 2.7/W·km, and the phase shift amount $\Delta\phi_{XPM}$ resulting from the cross-phase modulation in the DSF 102 becomes 1.01 rad.

Figure 2:
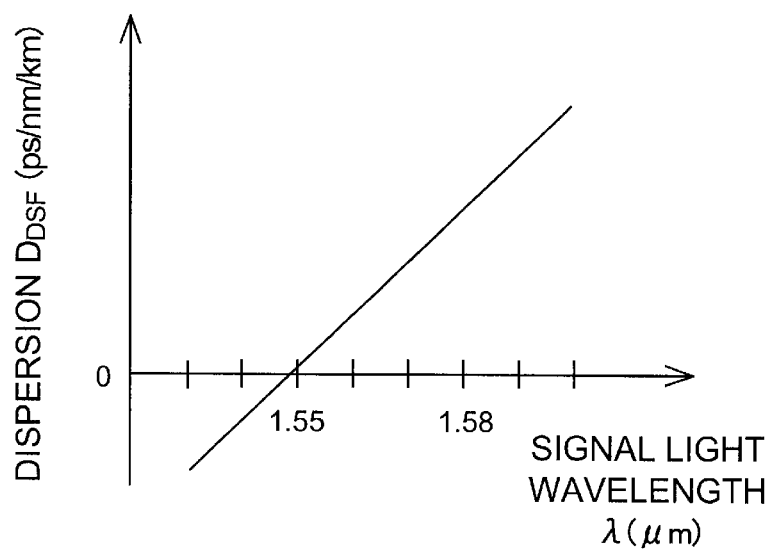
FIG. 2 is a graph showing the wavelength dependence of dispersion $D_{DSF}$ in a dispersion-shifted optical fiber.
Figure 3:
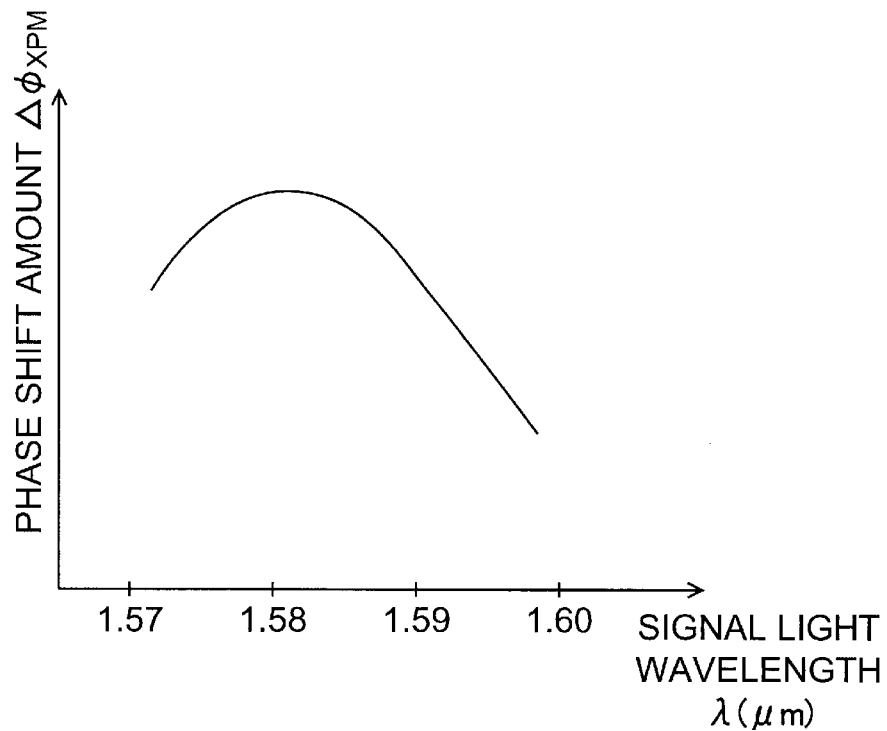
FIG. 3 is a graph showing the wavelength dependence of phase shift amount $\Delta\phi_{XPM}$ in the dispersion-shifted optical fiber.

The phase shift amount $\Delta\phi_{XPM}$ in the DSF 102 varies depending on signal light wavelength. This will be explained as follows. Here, FIG. 2 is a graph showing the wavelength dependence of the dispersion $D_{DSF}$ of DSF 102, whereas FIG. 3 is a graph showing the wavelength dependence of the phase shift amount $\Delta\phi_{XPM}$ in the DSF 102 assuming WDM communications with 32 channels with a wavelength ranging from 1.572 μm to 1.598 μm. As shown in FIG. 2, the dispersion $D_{DSF}$ of DSF 102 becomes zero near a wavelength of 1.55 μm and becomes smaller as the signal light wavelength λ is shorter in the 1.58-μm wavelength band. From this, it is considered that the phase shift amount $\Delta\phi_{XPM}$ in the DSF 102 becomes greater on the shorter wavelength side where the dispersion $D_{DSF}$ is smaller. In the case where many signal light components are transmitted in the 1.58-μm wavelength band, however, since the phase shift amount $\Delta\phi_{XPM}$ given by the above-mentioned expression (1)

depends on the wavelength difference between signal light components in addition to the dispersion $D_{DSF}$ at each wavelength, the phase shift amount $\Delta\phi_{XPM}$ is maximized in a signal light component having a wavelength somewhat longer than the shortest wavelength of signal light included in the signal light wavelength band as shown in FIG. 3.

In the hybrid transmission unit 100 constituted by the DSF 102 having a length $L_{DSF}$ and the SMF 103 having a length $L_{SMF}$, on the other hand, a parameter $D_T$ (total dispersion amount in the hybrid transmission unit 100) is given by the following expression:

$$D_T = (D_{DSF} \cdot L_{DSF} + D_{SMF} \cdot L_{SMF}) \cdot B^2 \qquad (6)$$

where B is the bit rate of signal light at each wavelength. Since $D_{DSF}$ is much smaller than $D_{SMF}$, the first term in the above-mentioned expression (6) becomes relatively smaller than the second term thereof if $L_{SMF}$ is an appropriate length, whereby the above-mentioned expression (6) can be approximated by the following expression:

$$D_T \approx D_{SMF} \cdot L_{SMF} \cdot B^2 \qquad (7)$$

For example, letting the dispersion $D_{SMF}$ of SMF 103 at a wavelength of 1.58 μm be 19 ps/nm/km, the length $L_{SMF}$ Of SMF 103 be 80 km, and the bit rate B of each signal light component be 2.5 Gb/s, the above-mentioned parameter $D_T$ becomes 9500 (ps/nm)·(Gb/s)².

Figure 4:
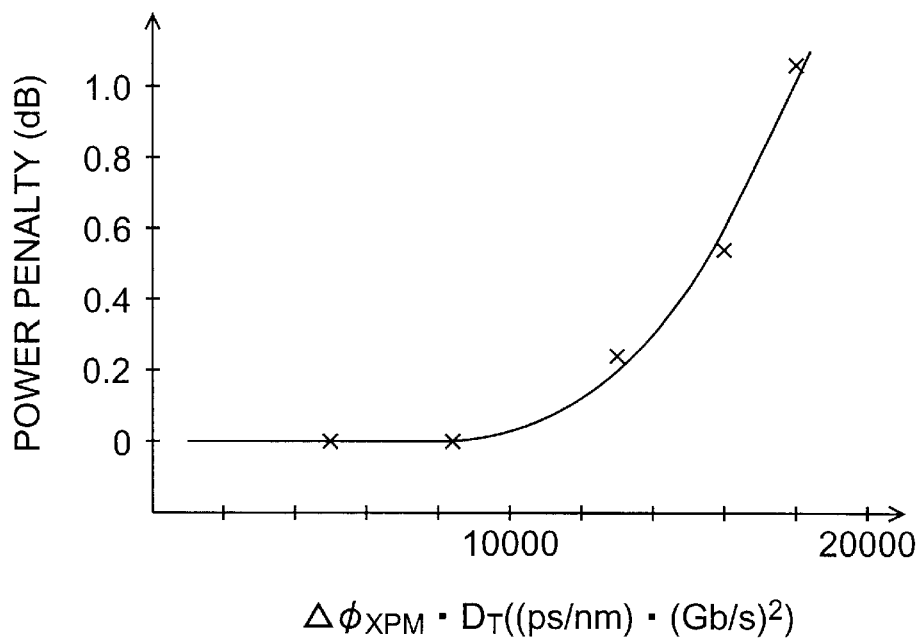
FIG. 4 is a graph showing the relationship between the product $\phi_{XPM} \cdot D_T$ and power penalty (dB)

The product $\Delta\phi_{XPM} \cdot D_T$ of the phase shift amount $\Delta\phi_{XPM}$ resulting from cross-phase modulation and the above-mentioned parameter $D_T$ will now be considered. In the example mentioned above, the product $\Delta\phi_{XPM} \cdot D_T$ becomes 10070 (ps/nm)·(Gb/s)². FIG. 4 is a graph showing the relationship between this product $\Delta\phi_{XPM} \cdot D_T$ and power penalty (dB). This graph was obtained by an experiment concerning 32 channels of signal light at intervals of 100 GHz in the 1.58-μm wavelength band, in which the power P of signal light incident on the DSF 102, the length $L_{DSF}$ of DSF 102, and the length $L_{SMF}$ of SMF 103 were changed among various values. Here, the SN ratio at the receiving end was about 23 dB.

When the product $\Delta\phi_{XPM} \cdot D_T$ was about 10000 (ps/nm)·(Gb/s)² or less, power penalty was substantially 0 dB as can be seen from this graph, whereby inconveniences concerning cross-phase modulation in the DSF 102 hardly occurred. When the product $\Delta\phi_{XPM} \cdot D_T$ was about 13000 (ps/nm)·(Gb/s)² or less, power penalty was about 0.2 dB or less at the output end of SMF 103, a bit error rate of $10^{-15}$ or less was seen to be achievable, and the deterioration of signal light waveforms caused by the cross-phase modulation occurring in the DSF 102 and the dispersion in its downstream SMF 103 was small. When the product $\Delta\phi_{XPM} \cdot D_T$ was about 18000 (ps/nm)·(Gb/s)² or less, power penalty was about 1.0 dB or less at the output end of SMF 103, a bit error rate of $10^{-9}$ or less was seen to be achievable, and the deterioration of signal light waveforms caused by the cross-phase modulation occurring in the DSF 102 and the dispersion in its downstream SMF 103 was at a permissible level.

In the optical communication system according to the first embodiment, as mentioned above, the product $\Delta\phi_{XPM} \cdot D_T$ is 18000(ps/nm)·(Gb/s)² or less with respect to the shortest wavelength of signal light included in the 1.58-μm wavelength band. As a consequence, power penalty becomes about 1.0 dB or less at the output end of SMF 103, and a bit error rate of $10^{-9}$ or less is attained. For satisfying such a condition, the power of signal light outputted from the optical fiber amplifier 101 so as to be fed into the DSF 102, the bit rate B, the wavelength intervals of WDM signals, the length $L_{DSF}$ of DSF 102, and the like are set appropriately.

Preferably, in the optical communication system according to the first embodiment, the product $\Delta\phi_{XPM} \cdot D_T$ is 13000 (ps/nm)·(Gb/s)² or less with respect to the shortest wavelength of signal light included in the 1.58-μm wavelength band. As a consequence, power penalty becomes about 0.2 dB or less at the output end of SMF 103, and a bit error rate of $10^{-15}$ or less can be attained. Most preferably, in the optical communication system according to the first embodiment, the product $\Delta\phi_{XPM} \cdot D_T$ is 13000 (ps/nm)·(Gb/s)² or less with respect to all of the signal light included in the 1.58-μm wavelength band.

For example, let the length $L_{DSF}$ of DSF 102 be 60 km, the transmission loss a of signal light in the DSF 102 be 0.23 dB/km, the effective length $L_{eff}$ of DSF 102 be 18 km, and the dispersion $D_{DSF}$ of DSF 102 at a wavelength of 1.58 μm be 3.3 ps/nm/km. For example, if the interval between wavelengths in two channels of signal light is 100 GHz, i.e., wavelength difference $\Delta\lambda$=0.8 nm, then the product $D_{DSF} \cdot L_{eff} \cdot \Delta\lambda$ becomes 48 ps. As the ratio of the product $D_{DSF} \cdot L_{eff} \cdot \Delta\lambda$ to the pulse width of signal light is smaller, the bit correlation becomes lower, whereby the occurrence of cross-phase modulation is effectively suppressed. Specifically, if the bit rate B is 10 Gb/s, then the pulse width of signal light is 100 ps, so that the ratio of the product $D_{DSF} \cdot L_{eff} \cdot \Delta\lambda$ to the pulse width of signal light is about 1/2, whereby the occurrence of cross-phase modulation is alleviated in general. Further, if the bit rate B is 2.5 Gb/s, then the pulse width of signal light is 400 ps, so that the ratio of the product $D_{DSF} \cdot L_{eff} \cdot \Delta\lambda$ to the pulse width of signal light is about 1/8, whereby the occurrence of cross-phase modulation becomes problematic in general. However, the deterioration of signal light waveforms on the output side can be suppressed in the optical communication system according to the first embodiment even in the case where the product $D_{DSF} \cdot L_{eff} \cdot \Delta\lambda$ 1/(2B) or less and under an inferior condition where the product $D_{DSF} \cdot L_{eff} \Delta\lambda$ is 1/(4B) or less.

Preferably, in the optical communication system according to the first embodiment, DSF 102 and SMF 103 each have a polarization mode dispersion of 2 ps·km$^{-\frac{1}{2}}$ or less at a wavelength of 1.58 μm. In addition, it is preferred that the hybrid transmission unit 100 as a whole has an accumulated polarization dispersion of 1/(4B) or less at a wavelength of 1.58 μm.

This is because of the reason explained in the following. The cross-phase modulation depends on the polarization state of signal light, so as to be maximized when the respective polarized waves of two wavelengths of signal light coincide with each other and minimized when they are orthogonal to each other. If the polarization mode dispersion is large, then the relative polarization state between individual signal light components changes while the signal light propagates, whereby the transmission characteristic of the optical communication system as a whole fluctuates depending on the state of signal light at the time when it is incident. Also, as the bit rate B is greater, the relative polarization state between individual signal light components changes more greatly. Therefore, in the first embodiment, the polarization mode dispersion of each of the DSF 102 and SMF 103 or the accumulated polarization dispersion of the hybrid transmission unit 100 as a whole is set within the range mentioned above, whereby the deterioration of signal light waveforms resulting from the cross-phase modulation and dispersion depending on the polarization state of each signal light component is effectively suppressed. The optical communication system may further comprise a polarization dispersion compensator, and the accumulated polarization dispersion of the hybrid transmission unit as a whole is improved when the polarization dispersion compensator is inserted.

Figure 5A:
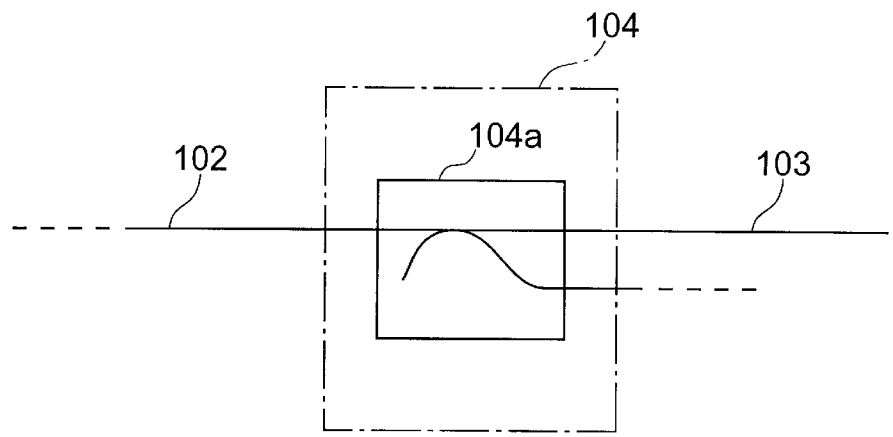
Figure 5B:
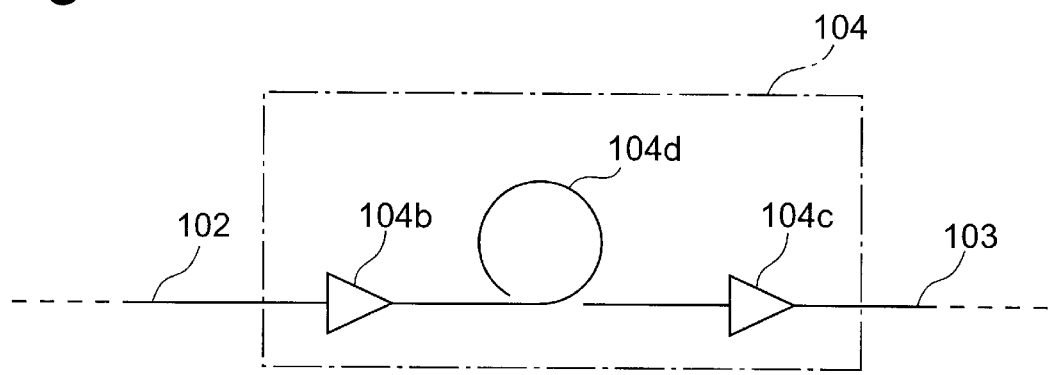
FIG. 5B is a view showing the configuration of a second applied example of the optical communication system according to the first embodiment shown in FIG. 1.

While the optical communication system according to the first embodiment is a system in which the hybrid transmission unit 100 as a minimum component unit is constituted by the DSF 102 and SMF 103, a repeater 104 including a coupler, an optical amplifier, and the like may be disposed between the DSF 102 and SMF 103. FIG. 5A is a view showing the configuration of a first applied example of the optical communication system according to the first embodiment, which is a system employing a repeater 104 including a one-input/two-output fiber coupler 104a. FIG. 5B is a view showing the configuration of a second applied example of the optical communication system according to the first embodiment, in which optical fiber amplifiers 104b, 104c are disposed within the repeater 104, whereas a dispersion-compensating optical fiber is disposed as a high-dispersion optical fiber between the optical fiber amplifiers 104b, 104c.

Second Embodiment

A second embodiment of the optical communication system according to the present invention will now be explained.

Figure 6:
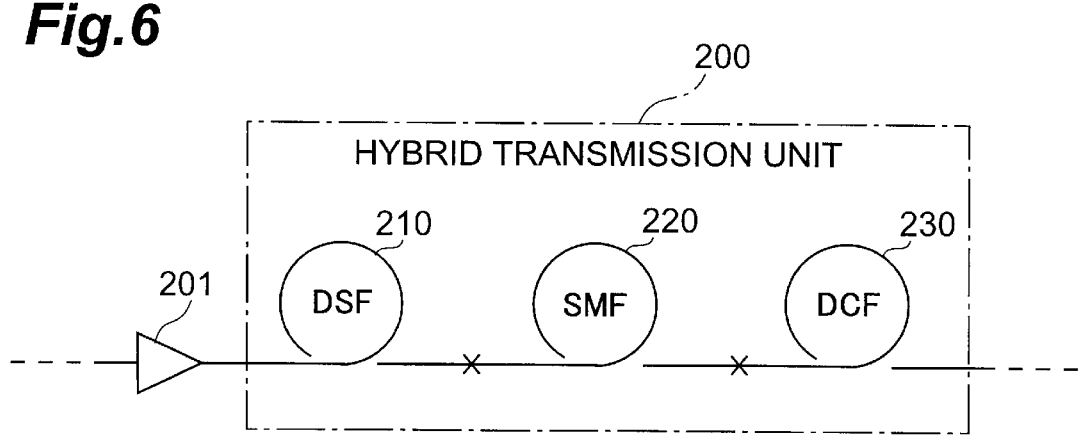
FIG. 6 is a view showing the configuration of a second embodiment of the optical communication system according to the present invention.

FIG. 6 is a view showing the configuration of the optical communication system according to the second embodiment. The optical communication system according to the second embodiment comprises an optical amplifier 201 for amplifying signal light in the 1.58-μm wavelength band, and a hybrid transmission unit 200 disposed downstream the optical fiber amplifier 201. The hybrid transmission unit 200 is constituted by a dispersion-shifted optical fiber (DSF) 210 disposed downstream the optical fiber amplifier 201, a single-mode optical fiber (SMF) 220 disposed downstream the DSF 210, and a dispersion-compensating optical fiber (DSF: Dispersion Compensating Fiber) 230 disposed downstream the SMF 220. There are cases where the DCF 230 constitutes a part of the optical fiber amplifier and is contained in a repeater.

In the second embodiment, the optical fiber amplifier 201, DSF 210, and SMF 220 correspond to the optical fiber amplifier 101, DSF 102, and SMF 103 in the first embodiment, respectively. The DCF 230 positioned downstream the SMF 220 functions to compensate for the dispersion of SMF 220 in the 1.58-μm wavelength band. Here, at a wavelength of 1.58 μm, the DCF 230 has a negative dispersion $D_{DCF}$ with an absolute value on the order of several tens of ps/nm/km. Therefore, the absolute value of the dispersion $D_{DCF}$ of DCF 230 is greater than the absolute value of any of the dispersion $D_{DSF}$ of DSF 210 and dispersion DSMF of SMF 220.

In the second embodiment, the hybrid transmission unit 200 is constituted by the DSF 210 having a length $L_{DSF}$, the SMF 220 having a length $L_{SMF}$, and the DCF 230 having a length $L_{DCF}$, a parameter $D_T$ (total dispersion amount in the hybrid transmission unit 200) is given by the following expression:

$$D_T = (D_{DSF} \cdot L_{DSF} + D_{SMF} \cdot L_{SMF} + D_{DCF} \cdot L_{DCF}) \cdot B^2 \quad (8)$$

where B is the bit rate of signal light at each wavelength. If the first term in the above-mentioned expression (8) is negligibly smaller than the second and third terms, then the above-mentioned expression (8) can be approximated by the following expression:

$$D_T \approx (D_{SMF} \cdot L_{SMF} + D_{DCF} \cdot L_{DCF}) \cdot B^2 \quad (9)$$

On the basis thereof, the product $\Delta\phi_{XPM} \cdot D_T$ of the phase shift amount $\Delta\phi_{XPM}$ resulting from cross-phase modulation and the above-mentioned parameter $D_T$ is considered.

In the optical communication system according to the second embodiment, the product $\Delta\phi_{XPM} \cdot D_T$ is 18000 (ps/nm)·(Gb/s)$^2$ or less with respect to the shortest wavelength of signal light included in the 1.58-μm wavelength band (signal light wavelength band). As a consequence of this configuration, a system having secured an appropriate SN ratio yields a power penalty of about 1.0 dB or less at the output end of DCF 230, and can attain a bit error rate of $10^{-9}$ or less. For satisfying such a condition, the power of signal light outputted from the optical fiber amplifier 201 so as to be fed into the DSF 210, the bit rate B, the wavelength intervals of WDM signals, the length $L_{DSF}$ of DSF 210, and the like are designed appropriately.

Preferably, in the optical communication system according to the second embodiment, the product $\Delta\phi_{XPM} \cdot D_T$ is 13000 (ps/nm)·(Gb/s)$^2$ or less with respect to the shortest wavelength of signal light included in the 1.58-μm wavelength band. As a consequence of this configuration, a system having secured an appropriate SN ratio yields a power penalty of about 0.2 dB or less at the output end of DCF 230, and can attain a bit error rate of $10^{-15}$ or less. Most preferably, in this embodiment, the product $\Delta\phi_{XPM} \cdot D_T$ is 13000 (ps/nm)·(Gb/s)$^2$ or less with respect to all of the signal light included in the 1.58-μm wavelength band.

Preferably, at a wavelength of 1.58μm, the DSF 210 has a polarization mode dispersion of 2 ps·km$^{-\frac{1}{2}}$ or less, the SMF 220 has a polarization mode dispersion of 2 ps·km$^{-\frac{1}{2}}$ or less, and the DCF 230 has a polarization mode dispersion of 1 ps·km$^{-\frac{1}{2}}$ or less in the optical communication system according to the second embodiment. Preferably, the hybrid transmission unit 200 as a whole has an accumulated polarization dispersion of 1/(4B) or less at a wavelength of 1.58 μm in the optical communication system according to the second embodiment as well. Such a configuration can also effectively suppress the deterioration of signal light waveforms resulting from the cross-phase modulation and dispersion depending on the polarization state of signal light.

In particular, since the optical communication system according to the second embodiment comprises the DCF 230 having the dispersion $D_{DCF}$ with a polarity opposite to that of the dispersion $D_{SMF}$ of SMF 220, the value of parameter $D_T$ and, consequently, the value of product $\Delta\phi_{XPM} \cdot D_T$ can be lowered, whereby the reduction of power penalty and reduction of bit error rate can be realized more reliably.

Third Embodiment

Figure 7:
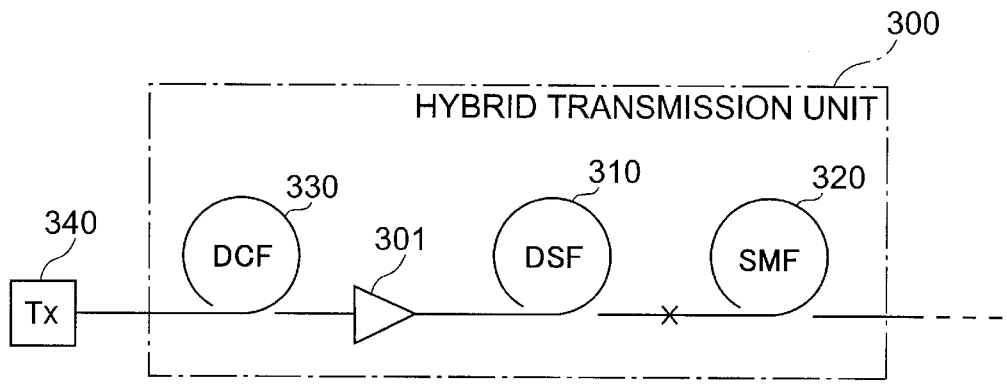
FIG. 7 is a view showing the configuration of a third embodiment of the optical communication system according to the present invention.

A third embodiment of the optical communication system according to the present invention will now be explained. FIG. 7 is a view showing the configuration of the optical communication system according to the third embodiment. The optical communication system according to the third embodiment comprises a transmitter 340 for sending out a plurality of signal light components in the 1.58-μm wavelength band, and a hybrid transmission unit 300 disposed downstream the transmitter 340. The hybrid transmission unit 300 comprises a dispersion-compensating optical fiber (DCF) 330, a dispersion-shifted optical fiber (DSF) 310 disposed downstream the DCF 330, and a single-mode optical fiber (SMF) 320 disposed downstream the DSF 310. Here, an optical fiber amplifier 301 for amplifying signal light in the 1.58-μm wavelength band is disposed between the DCF 330 and DSF 310.

The optical fiber amplifier 301, DSF 310, SMF 320, and DCF 330 in the third embodiment correspond to the optical fiber amplifier 201, DSF 210, SMF 220, and DCF 230 in the above-mentioned second embodiment, respectively. However, the configuration of the third embodiment differs from that of the second embodiment in that the DCF 330 is disposed between the transmitter 340 and optical fiber amplifier 301.

As in the second embodiment, the parameter Dhd Tis given as indicated by the above-mentioned expression (8) and can be approximated as indicated by expression (9) in the third embodiment.

The product $\Delta\phi_{XPM} \cdot D_T$ is 18000 (ps/nm)·(Gb/s)$^2$ or less with respect to the shortest wavelength of signal light included in the 1.58-μm wavelength band in the optical communication system according to the third embodiment as well. As a consequence, a system having secured an appropriate SN ratio yields a power penalty of about 1.0 dB or less at the output end of SMF 320, and can attain a bit error rate of 10$^{-9}$ or less. For satisfying such a condition, the power of signal light incident on the DSF 310 after being outputted from the optical fiber amplifier 301, the bit rate B, the wavelength intervals of WDM signals sent out from the transmitter 340, the length $L_{DSF}$ of DSF 310, and the like are designed appropriately.

Preferably, in the optical communication system according to the third embodiment, the product $\Delta\phi_{XPM} \cdot D_T$ is 13000 (ps/nm)·(Gb/s)$^2$ or less with respect to the shortest wavelength of signal light included in the 1.58-μwavelength band. As a consequence of this configuration, a system having secured an appropriate SN ratio yields a power penalty of about 0.2 dB or less at the output end of SMF 320, and can attain a bit error rate of 10$^{-15}$ or less. Most preferably, in this embodiment, the product $\Delta\phi_{XPM} \cdot D_T$ is 13000 (ps/nm)·(Gb/s)$^2$ or less with respect to all of the signal light included in the 1.58-μm wavelength band.

Preferably, at a wavelength of 1.58 μm, the DSF 310 has a polarization mode dispersion of 2 ps·km$^{-\frac{1}{2}}$ or less, the SMF 320 has a polarization mode dispersion of 2 ps·km$^{-\frac{1}{2}}$ or less, and the DCF 330 has a polarization mode dispersion of 1 ps·km$^{-\frac{1}{2}}$ or less in the optical communication system according to the third embodiment. Preferably, the hybrid transmission unit 300 as a whole has an accumulated polarization dispersion of 1/(4B) or less at a wavelength of 1.58 μm in the optical communication system according to the third embodiment as well. Such a configuration can also effectively suppress the deterioration of signal light waveforms resulting from the cross-phase modulation and dispersion depending on the polarization state of signal light.

Since the hybrid transmission unit 300 as a minimum component unit comprises the DCF 330 having the dispersion $D_{DCF}$ with a polarity opposite to that of the dispersion $D_{SMF}$ of SMF 320, the value of parameter $D_T$ and, consequently, the value of product $\Delta\phi_{XPM} \cdot D_T$ can be lowered, whereby the reduction of power penalty and reduction of bit error rate can be realized more reliably.

In particular, since the DCF 330 is disposed upstream the optical fiber amplifier 301, the third embodiment yields effects as follows. The DCF 330 has a very high nonlinear characteristic, so that the upper limit of signal light power where favorable transmission characteristics can be secured is low. However, since the DCF 330 is disposed upstream the optical fiber amplifier 301, the power of signal light propagating through the DCF 330 can be kept low, whereby the occurrence of nonlinear optical phenomena can effectively be suppressed (signal light waveforms can be kept from deteriorating) in the DCF 330 in the third embodiment.

Further, since the DCF 330 is disposed between the transmitter 340 and the optical fiber amplifier 301, the pulse waveform of signal light outputted from the transmitter 340 is widened by the DCF 330 having a large negative dispersion in the third embodiment. As a result, the signal light emitted from the DCF 330 would enter the optical fiber amplifier 301 in the state where its peak power is effectively lowered. Therefore, as compared with optical communication systems comprising no DCF 330, signal light having a lower peak power would propagate through the DSF 310, whereby the occurrence of nonlinear optical phenomena can effectively be suppressed (signal light waveforms can be kept from deteriorating) in the DSF 310 by such a configuration as well.

Fourth Embodiment

Figure 8:
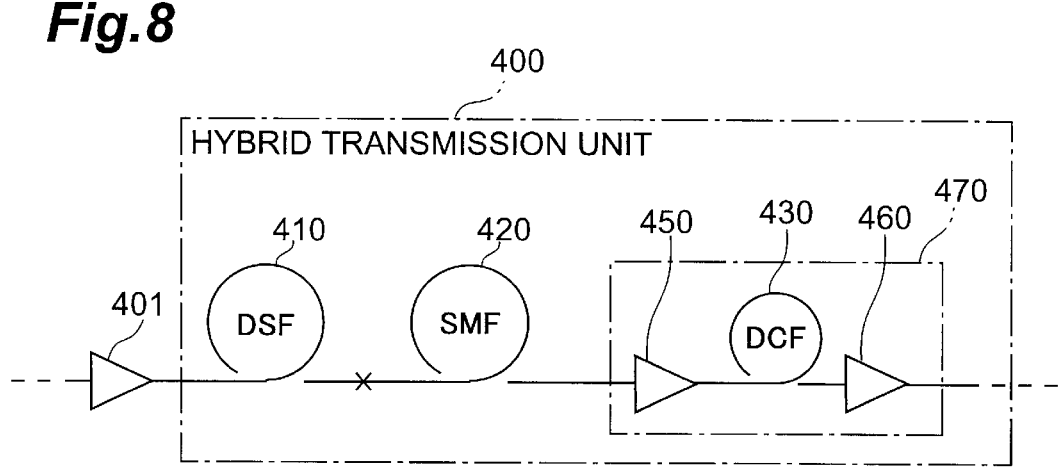
FIG. 8 is a view showing the configuration of a fourth embodiment of the optical communication system according to the present invention.

A fourth embodiment of the optical communication system according to the present invention will now be explained. FIG. 8 is a view showing the configuration of the optical communication system according to the fourth embodiment. The optical communication system according to the fourth embodiment comprises an optical fiber amplifier 401 for amplifying signal light included in the 1.58-μm wavelength band, and a hybrid transmission unit 400 disposed downstream the optical fiber amplifier 401. The hybrid transmission unit 400 comprises a dispersion-shifted optical fiber (DSF) 410, a single-mode optical fiber (SMF) 420 disposed downstream the DSF 410, and a repeater 470 disposed downstream the SMF 420. The repeater 470 comprises an optical fiber amplifier 450 disposed downstream the SMF 420, a dispersion-compensating optical fiber (DCF) 430 disposed downstream the optical fiber amplifier 450, and an optical fiber amplifier 460 disposed downstream the DCF 430.

The optical fiber amplifier 401, DSF 410, SMF 420, and DCF 430 in the fourth embodiment correspond to the optical fiber amplifier 201, DSF 210, SMF 220, and DCF 230 in the second embodiment, respectively. However, the configuration of the fourth embodiment differs from that of the second embodiment in that the DCF 430 is disposed between the optical fiber amplifiers 450, 460 within the repeater 470.

As in the second embodiment, the parameter $D_T$ is given as indicated by the above-mentioned expression (8) and can be approximated as indicated by expression (9) in the fourth embodiment.

The product $\Delta\phi_{XPM} \cdot D_T$ is 18000 (ps/nm)·(Gb/s)$^2$ or less with respect to the shortest wavelength of signal light included in the 1.58-μm wavelength band in the optical communication system according to the fourth embodiment as well. As a consequence, a system having secured an appropriate SN ratio yields a power penalty of about 1.0 dB or less at the output end of repeater 470 (output end of the optical fiber amplifier 460), and can attain a bit error rate of 10$^{-9}$ or less. For satisfying such a condition, the power of signal light incident on the DSF 410 after being outputted from the optical fiber amplifier 401, the bit rate B, the wavelength intervals of WDM signals, the length $L_{DSF}$ of DSF 410, and the like are designed appropriately.

Preferably, in the optical communication system according to the fourth embodiment, the product $\Delta\phi_{XPM} \cdot D_T$ is 13000 (ps/nm)·(Gb/s)$^2$ or less with respect to the shortest wavelength of signal light included in the 1.58-μm wavelength band. As a consequence of such a configuration, a system having secured an appropriate SN ratio yields a power penalty of about 0.2 dB or less at the output end of repeater 470 (output end of the optical fiber amplifier 460), and can attain a bit error rate of 10$^{-15}$ or less. Most preferably, the product $\Delta\phi_{XPM} \cdot D_T$ is 13000 (ps/nm)·(Gb/s)$^2$ or less with respect to all of the signal light included in the 1.58-μm wavelength band.

Preferably, at a wavelength of 1.58 μm, the DSF 410 has a polarization mode dispersion of 2 ps·km$^{-\frac{1}{2}}$ or less, the SMF 420 has a polarization mode dispersion of 2 ps·km$^{-\frac{1}{2}}$ or less, and the DCF 430 has a polarization mode dispersion of 1 ps·km$^{-1/2}$ or less in the optical communication system according to the fourth embodiment. Preferably, the hybrid transmission unit 400 as a whole has an accumulated polarization dispersion of 1/(4B) or less at a wavelength of 1.58 µm in the optical communication system according to the fourth embodiment as well. Such a configuration can also effectively suppress the deterioration of signal light waveforms resulting from the cross-phase modulation and dispersion depending on the polarization state of signal light.

Since the hybrid transmission unit 400 as a minimum component unit comprises the DCF 430 having the dispersion $D_{DCF}$ with a polarity opposite to that of the dispersion $D_{SMF}$ of SMF 420, the value of parameter $D_T$ and, consequently, the value of product $\Delta\phi_{XPM} \cdot D_T$ can be lowered, whereby the reduction of power penalty and reduction of bit error rate can be realized more reliably.

In particular, since the DCF 430 is disposed between the optical fiber amplifiers 450, 460 within the repeater 470, the fourth embodiment further yields effects as follows. The signal light outputted from the optical fiber amplifier 401 lowers its power by propagating through the DSF 410 and SMF 420 in succession. Subsequently, the power of signal light having passed through the SMF 420 is somewhat restored by the optical fiber amplifier 450, but is lowered again as the signal light propagates through the DCF 430. Then, the power of signal light having passed through the DCF 430 is completely restored by the optical fiber amplifier 460. Here, the output light power from the optical fiber amplifier 450 attains such a magnitude that the occurrence of nonlinear optical phenomena in the DCF 430 is unproblematic in terms of transmission characteristics. Such a configuration can keep signal light waveforms from deteriorating due to the propagation through the DCF 430.

Further, if an Er-doped optical fiber amplifier (EDFA) for amplifying signal light included in the 1.58-µm wavelength band is employed as the optical fiber amplifiers 450, 460, then the gain deviation (wavelength dependence) of the repeater 470 as a whole in the signal light wavelength band (amplification wavelength band) can easily be flattened. In an optical communication system in which a plurality of repeaters are disposed at predetermined intervals, the extent of nonlinear deterioration will heavily depend on wavelength if each repeater has a large gain deviation. However, since the fourth embodiment (as in the configuration shown in FIG. 5B) is optimally designed in view of the loss wavelength dependence of DCF as well, the gain deviation in each repeater can easily be flattened. As a consequence, the signal wavelength dependence of power penalty and bit error rate can be suppressed to a low level.

Without being restricted to the above-mentioned embodiments, the present invention can be modified in various manners. For example, the SMF 220 and DCF 230 in the second embodiment may be disposed in reverse order. The position where the DCF is disposed should not be restricted by the above-mentioned embodiments, and is not limited in particular as long as it is located where the signal light power is sufficiently low and nonlinear optical phenomena are hard to occur.

In accordance with the present invention, as in the foregoing, the optical communication system includes at least one hybrid transmission unit, as a minimum component unit, having a configuration in which a first high-dispersion optical fiber is disposed downstream a dispersion-shifted optical fiber or a configuration further having a second high-dispersion optical fiber exhibiting a dispersion with a polarity different from that of the dispersion of the first high-dispersion optical fiber, whereby the deterioration of signal lightwave forms resulting from interactions between nonlinear optical phenomena (cross-phase modulation in particular) and dispersion occurring in WDM communications in the 1.58-µm wavelength band can effectively be suppressed if the product $\Delta\phi_{XPM} \cdot D_T$ is set to 18000 (ps/nm)·(Gb/s)$^2$ or less with respect to the shortest wavelength of signal light included in the 1.58-µm wavelength band. In addition, power penalty becomes about 1.0 dB or less, and bit error rate becomes 10$^{-9}$ or less, whereby WDM communications can be effected with a higher quality in the optical communication system.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical communication system including at least one hybrid transmission unit, said hybrid transmission unit comprising:

a dispersion-shifted optical fiber with a length $L_{DSF}$, having a zero-dispersion wavelength in a 1.55-µm wavelength band (1530 nm or more but less than 1565 nm) and a dispersion $D_{DSF}$ with an absolute value of 0.5 ps/nm/km or more with respect to light having a wavelength of 1.58 µm; and a first high-dispersion optical fiber with a length $L_1$, disposed such that light outputted from said dispersion-shifted optical fiber propagates therethrough, having a dispersion $D_1$ with an absolute value greater than that of the dispersion $D_{DSF}$ of said dispersion-shifted optical fiber with respect to light having a wavelength of 1.58 µm;

said hybrid transmission unit satisfying, with respect to at least signal light having the shortest wavelength in signal light having a bit rate B included in a signal light wavelength band in which wavelength ranges from 1.565 µm to 1.610 µm, the following condition:

$\Delta\phi_{XPM} \cdot D_T \leq 18000$ (unit: (ps/nm)·(Gb/s)$^2$)

$D_T = (D_{DSF} \cdot L_{DSF} + D_1 \cdot L_1) \cdot B^2$ where $\Delta\phi_{XPM}$ is the total phase shift amount of cross-phase modulation in said signal light having the shortest wavelength under the influence of signal light having the other wavelengths, and $D_T$ is the total dispersion in said hybrid transmission unit.

2. An optical communication system according to claim 1, wherein N (>2) channels of signal light propagate therethrough;

wherein the total phase shift amount $\Delta\phi_{XPM}(i)$ resulting from the cross-phase modulation in signal light having a wavelength $\lambda_i$ (i=1, 2, . . . , N) incident on said dispersion-shifted optical fiber under the influence of signal light having a wavelength $\lambda_j$ (j=1, 2, . . . , N; j≠i) is given by the following expression:

$$\Delta\phi_{XPM}(i) = 2 \cdot \gamma \cdot L_{eff} \cdot \sum_{(j=1, j \neq i)}^{N} \left( P(j) \cdot \sqrt{\eta_{XPM}(i, j)} \right)$$

where γ is the nonlinear coefficient in said dispersion-shifted optical fiber, $L_{eff}$ is the effective length of said dispersion-shifted optical fiber, P(j) is the peak power of each of (N−1) channels of signal light excluding the wavelength $\lambda_i$, and $\eta_{XPM}(i, j)$ is the efficiency of occurrence of cross-phase modulation between the wavelengths $\lambda_i$ and $\lambda_j$ of signal light; and wherein the effective length $L_{eff}$ of said dispersion-shifted optical fiber and the efficiency of occurrence of cross-phase modulation $\eta_{XPM}(i, j)$ between the wavelengths $\lambda_i$ and $\lambda_j$ of signal light are given by the following expressions:

$$L_{eff} = (1 - \exp(-\alpha \cdot L_{DSF}))\alpha$$

$$\eta_{XPM}(i,j) = \frac{\alpha^2}{\Omega_m^2 \cdot d(i,j)^2 + \alpha^2} \cdot \left[1 + \frac{4 \cdot \sin^2\left(\Omega_m \cdot d(i,j) \cdot \frac{L_{DSF}}{2}\right) \cdot e^{-\alpha L_{DSF}}}{(1 - e^{-\alpha L_{DSF}})^2}\right]$$

where $\alpha$ is the transmission loss in said dispersion-shifted optical fiber, $\Omega_m$ is the modulation frequency, and $d(i, j)$ is the delay time difference per unit distance between the wavelengths $\lambda_i$ and $\lambda_j$ of signal light.

3. An optical communication system according to claim 1, wherein two channels of signal light having respective wavelengths $\lambda_1$ and $\lambda_2$ propagate therethrough;

wherein the total phase shift amount $\Delta\phi_{XPM}(1)$ resulting from the cross-phase modulation in signal light having the wavelength $\lambda_1$ incident on said dispersion-shifted optical fiber under the influence of signal light having the wavelength $\lambda_2$ is given by the following expression:

$$\Delta\phi_{XPM}(1) = 2 \cdot \gamma \cdot L_{eff} \cdot (P(2) \cdot \sqrt{f_{XPM(1,2)}})$$

where $\gamma$ is the nonlinear coefficient in said dispersion-shifted optical fiber, $L_{eff}$ is the effective length of said dispersion-shifted optical fiber, $P(2)$ is the peak power of the signal light having the wavelength $\lambda_2$, and $\eta_{XPM}(1,2)$ is the efficiency of occurrence of cross-phase modulation between the wavelengths $\lambda_1$ and $\lambda_2$ of signal light; and wherein the effective length $L_{eff}$ of said dispersion-shifted optical fiber and the efficiency of occurrence of cross-phase modulation $\eta_{XPM}(1,2)$ between the wavelengths $\lambda_1$ and $\lambda_2$ of signal light are given by the following expressions:

$$L_{eff} = (1 - \exp(-\alpha \cdot L_{DSF}))/\alpha$$

$$\eta_{XPM}(1,2) = \frac{\alpha^2}{\Omega_m^2 \cdot d(1,2)^2 + \alpha^2} \cdot \left[1 + \frac{4 \cdot \sin^2\left(\Omega_m \cdot d(1,2) \cdot \frac{L_{DSF}}{2}\right) \cdot e^{-\alpha L_{DSF}}}{(1 - e^{-\alpha L_{DSF}})^2}\right]$$

where $\alpha$ is the transmission loss in said dispersion-shifted optical fiber, $\Omega_m$ is the modulation frequency, and $d(1,2)$ is the delay time difference per unit distance between the wavelengths $\lambda_1$ and $\lambda_2$ of signal light.

4. An optical communication system according to claim 1, wherein said hybrid transmission unit satisfies the condition of:

$$\Delta\phi_{XPM} \cdot D_T \leq 13000 \text{ (unit: } (ps/nm) \cdot (Gb/s)^2)$$

with respect to at least the shortest wavelength of signal light included in said signal light wavelength band.

5. An optical communication system according to claim 1, wherein said hybrid transmission unit satisfies the condition of:

$$\Delta\phi_{XPM} \cdot D_T \leq 13000 \text{ (unit: } (ps/nm) \cdot (Gb/s)^2)$$

with respect to all of the signal light included in said signal light wavelength band.

6. An optical communication system according to claim 1, wherein said dispersion-shifted optical-fiber has a positive dispersion at a wavelength of 1.58 μm.

7. An optical communication system according to claim 1, wherein each of said dispersion-shifted optical fiber and first high-dispersion optical fiber has a polarization mode dispersion of 2 ps·km$^{-\frac{1}{2}}$ or less in said signal light wavelength band.

8. An optical communication system according to claim 1, wherein said hybrid transmission unit as a whole has a accumulated polarization dispersion of 1/(4B) or less in said signal light wavelength band.

9. An optical communication system according to claim 1, further comprising an optical amplifier for amplifying signal light included in said signal light wavelength band, said optical amplifier being disposed in one of a transmission line through which light to enter said dispersion-shifted optical fiber propagates, a transmission line between said dispersion-shifted optical fiber and said first high-dispersion optical fiber, and a transmission line through which light emitted from said first high-dispersion optical fiber is to propagate.

10. An optical communication system according to claim 9, wherein said optical amplifier includes a second high-dispersion optical fiber having a dispersion $D_2$ with an absolute value greater than that of the dispersion $D_{DSF}$ of said dispersion-shifted optical fiber and a polarity different from that of the dispersion $D_1$ of said first high-dispersion optical fiber.

11. An optical communication system including at least one hybrid transmission unit, said hybrid transmission unit comprising:

a dispersion-shifted optical fiber with a length $L_{DSF}$, having a zero-dispersion wavelength in a 1.55-μm wavelength band (1530 nm or more but less than 1565 nm) and a dispersion $D_{DSF}$ with an absolute value of 0.5 ps/nm/km or more with respect to light having a wavelength of 1.58 μm;

a first high-dispersion optical fiber with a length $L_1$, disposed such that light outputted from said dispersion-shifted optical fiber propagates therethrough, having a dispersion $D_1$ with an absolute value greater than that of the dispersion $D_{DSF}$ of said dispersion-shifted optical fiber with respect to light having a wavelength of 1.58 μm; and a second high-dispersion optical fiber, having a length $L_2$, disposed in one of a transmission line through which light to enter said dispersion-shifted optical fiber propagates, a transmission line between said dispersion-shifted optical fiber and said first high-dispersion optical fiber, and a transmission line through which light emitted from said first high-dispersion optical fiber is to propagate, said second high-dispersion optical fiber having a dispersion $D_2$ with an absolute value greater than that of the dispersion $D_{DSF}$ of said dispersion-shifted optical fiber and a polarity different from that of the dispersion $D_1$ of said first high-dispersion optical fiber;

said hybrid transmission unit satisfying, with respect to at least signal light having the shortest wavelength in signal light having a bit rate B included in a signal light wavelength band in which wavelength ranges from 1.565 μm to 1.610 μm, the following condition:

$$\Delta\phi_{XPM} \cdot D_T \leq 18000 \ (\text{unit}: (ps/nm) \cdot (Gb/s)^2)$$

$$D_T = (D_{DSF} \cdot L_{DSF} + D_1 \cdot L_1 + D_2 \cdot L_2) \cdot B^2$$

where $\Delta\phi_{XPM}$ is the total phase shift amount of cross-phase modulation in said signal light having the shortest wavelength ubder the influence of signal light having the other wavelengths, and $D_T$ is the total dispersion in said hybrid transmission unit.

12. An optical communication system according to claim 11, wherein N (>2) channels of signal light propagate therethrough;

wherein the total phase shift amount $\Delta\phi_{XPM}(i)$ resulting from the cross-phase modulation in signal light having a wavelength $\lambda_i$ (i=1, 2, . . . , N) incident on said dispersion-shifted optical fiber under the influence of signal light having a wavelength $\lambda_j$ (j=1, 2, . . . , N; j≠i) is given by the following expression:

$$\Delta\phi_{XPM}(i) = 2 \cdot \gamma \cdot L_{eff} \cdot \sum_{(j=1, j \neq i)}^{N} \left( P(j) \cdot \sqrt{\eta_{XPM}(i,j)} \right)$$

where γ is the nonlinear coefficient in said dispersion-shifted optical fiber, $L_{eff}$ is the effective length of said dispersion-shifted optical fiber, P(j) is the peak power of each of (N−1) channels of signal light excluding the wavelength $\lambda_i$, and $\eta_{XPM}(i, j)$ is the efficiency of occurrence of cross-phase modulation between the wavelengths $\lambda_i$ and $\lambda_j$ of signal light; and wherein the effective length $L_{eff}$ of said dispersion-shifted optical fiber and the efficiency of occurrence of cross-phase modulation $\eta_{XPM}(i, j)$ between the wavelengths $\lambda_i$ and $\lambda_j$ of signal light are given by the following expressions:

$$L_{eff} = (1 - \exp(-\alpha \cdot L_{DSF}))/\alpha$$

$$\eta_{XPM}(i,j) = \frac{\alpha^2}{\Omega_m^2 \cdot d(i,j)^2 + \alpha^2} \cdot \left[ 1 + \frac{4 \cdot \sin^2\left(\Omega_m \cdot d(i,j) \cdot \frac{L_{DSF}}{2}\right) \cdot e^{-\alpha L_{DSF}}}{(1-e^{-\alpha L_{DSF}})^2} \right]$$

where α is the transmission loss in said dispersion-shifted optical fiber, $\Omega_m$ is the modulation frequency, and d(i, j) is the delay time difference per unit distance between the wavelengths $\lambda_i$ and $\lambda_j$ of signal light.

13. An optical communication system according to claim 11, wherein two channels of signal light having respective wavelengths $\lambda_1$ and $\lambda_2$ propagate therethrough;

wherein the total phase shift amount $\Delta\phi_{XPM}(1)$ resulting from the cross-phase modulation in signal light having the wavelength $\lambda_1$ incident on said dispersion-shifted optical fiber under the influence of signal light having the wavelength $\lambda_2$ is given by the following expression:

$$\Delta\phi_{XPM}(1) = 2 \cdot \gamma \cdot L_{eff} \cdot (P(2) \cdot \sqrt{\eta_{XPM}(1,2)})$$

where γ is the nonlinear coefficient in said dispersion-shifted optical fiber, $L_{eff}$ is the effective length of said dispersion-shifted optical fiber, P(2) is the peak power of the signal light having the wavelength $\lambda_2$, and $\eta_{XPM}(1,2)$ is the efficiency of occurrence of cross-phase modulation between the wavelengths $\lambda_1$ and $\lambda_2$ of signal light; and wherein the effective length $L_{eff}$ of said dispersion-shifted optical fiber and the efficiency of occurrence of cross-phase modulation $\eta_{XPM}(1,2)$ between the wavelengths $\lambda_1$ and $\lambda_2$ of signal light are given by the following expressions:

$$L_{eff} = (1 - \exp(-\alpha \cdot L_{DSF}))/\alpha$$

$$\eta_{XPM}(1,2) = \frac{\alpha^2}{\Omega_m^2 \cdot d(1,2)^2 + \alpha^2} \cdot \left[ 1 + \frac{4 \cdot \sin^2\left(\Omega_m \cdot d(1,2) \cdot \frac{L_{DSF}}{2}\right) \cdot e^{-\alpha L_{DSF}}}{(1-e^{-\alpha L_{DSF}})^2} \right]$$

where α is the transmission loss in said dispersion-shifted optical fiber, $\Omega_m$ is the modulation frequency, and d(1,2) is the delay time difference per unit distance between the wavelengths $\lambda_1$ and $\lambda_2$ of signal light.

14. An optical communication system according to claim 11, wherein said hybrid transmission unit satisfies the condition of:

$$\Delta\phi_{XPM} \cdot D_T \leq 13000 \ (\text{unit}: (ps/nm) \cdot (Gb/s)^2)$$

with respect to at least the shortest wavelength of signal light included in said signal light wavelength band.

15. An optical communication system according to claim 11, wherein said hybrid transmission unit satisfies the condition of:

$$\Delta\phi_{XPM} \cdot D_T \leq 13000 \ (\text{unit}: (ps/nm) \cdot (Gb/s)^2)$$

with respect to all of the signal light included in said signal light wavelength band.

16. An optical communication system according to claim 11, wherein said dispersion-shifted optical fiber has a positive dispersion with respect to light at a wavelength of 1.58 μm.

17. An optical communication system according to claim 11, where in one of said first and second high-dispersion optical fibers includes a single-mode optical fiber having a zero-dispersion wavelength in a 1.3-μm wavelength band, whereas the other includes a dispersion-compensating optical fiber for compensating for the dispersion of said single-mode optical fiber in the 1.55-μm wavelength band.

18. An optical communication system according to claim 17, further comprising an optical amplifier, disposed in a transmission line through which light to enter said dispersion-shifted optical fiber propagates, for amplifying signal light in said signal light wavelength band, said dispersion-shifted optical fiber being disposed in a transmission line through which light to enter said optical amplifier propagates.

19. An optical communication system according to claim 11, wherein, in said signal light wavelength band, each of said dispersion-shifted optical fiber and first high-dispersion optical fiber has a polarization mode dispersion of 2 ps·km$^{-\frac{1}{2}}$ or less, and said second high-dispersion optical fiber has a polarization mode dispersion of 1 ps·km$^{-\frac{1}{2}}$ or less.

20. An optical communication system according to claim 11, wherein said hybrid transmission unit as a whole has a cumulative polarization dispersion of 1/(4B) or less in said signal light wavelength band.

* * * * *